Nov. 8, 1966   H. M. TURNER   3,283,363
VARIABLE EXTRUSION APPARATUS
Filed Aug. 13, 1962   3 Sheets-Sheet 1

INVENTOR
HOWARD M. TURNER
BY *Marm, Porter, Diller & Stewart*
ATTORNEYS

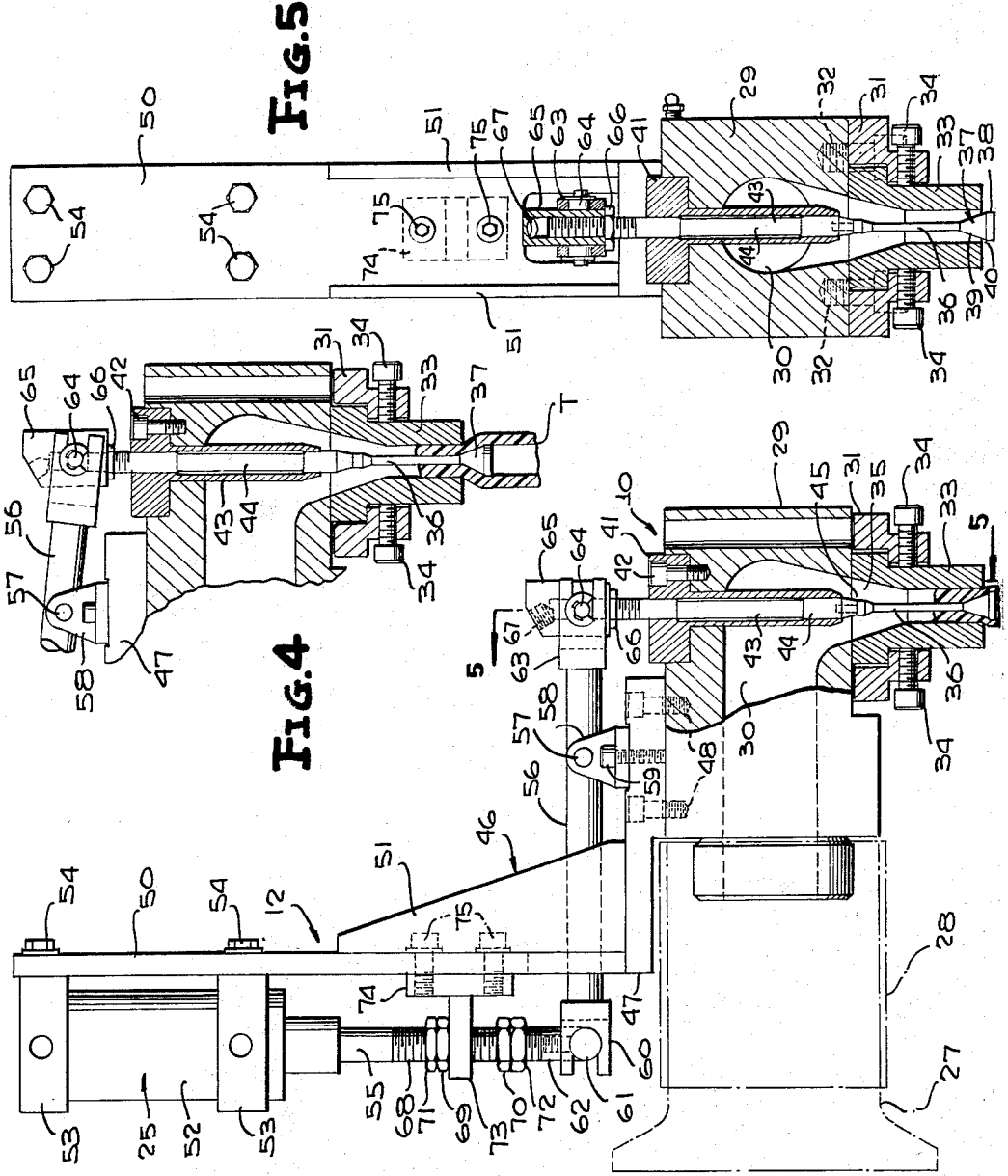

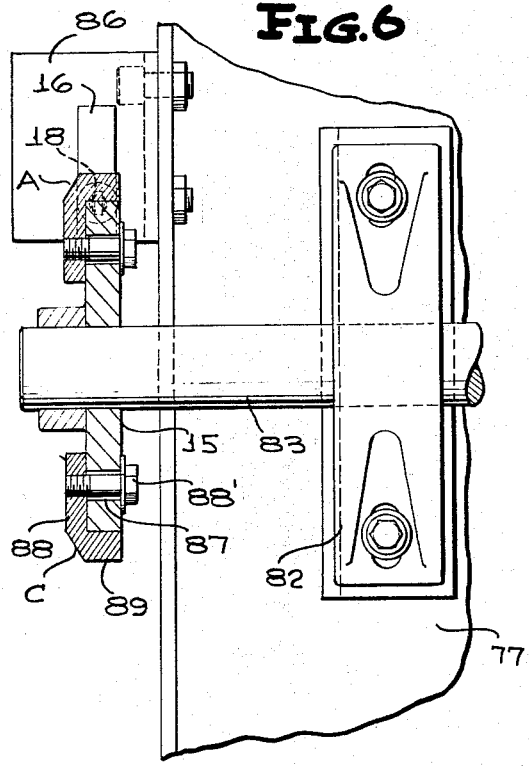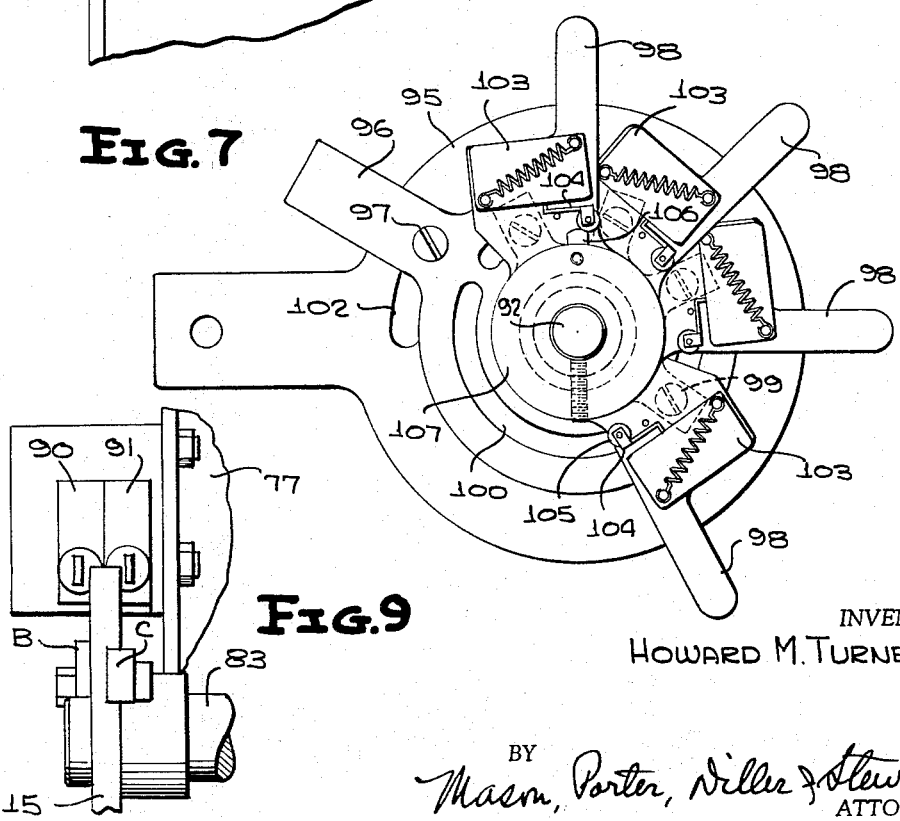

United States Patent Office 3,283,363
Patented Nov. 8, 1966

3,283,363
VARIABLE EXTRUSION APPARATUS
Howard M. Turner, Oak Forest, Ill., assignor to Continental Can Company, Inc., New York, N.Y., a corporation of New York
Filed Aug. 13, 1962, Ser. No. 216,536
6 Claims. (Cl. 18—5)

This invention relates in general to new and useful improvements in plastic extrusion apparatus, and more particularly to an extrusion apparatus which is particularly adapted for extruding a continuous tube to be utilized in the blow molding of articles such as plastic bottles, and wherein the extrusion apparatus is variable to produce tubing having varied cross sections.

This invention pertains to the blow molding of articles in a continuously operating machine which repeatedly presents molds to the path of an extruded tube wherein the halves of the molds close about the extruded tube and pinch off portions thereof, after which air is injected into the pinched-off portions of the tubes to blow the tubes within the molds to conform to the cross sections of the molds. This in itself is conventional. However, heretofore the tubes have primarily been of constant cross section with the result that excess material is provided in some portions of the article being molded and insufficient material is present in other portions of the article. Attempts have been made to vary the cross section of the tube in accordance with the blow molding requirements of an associated mold. However, before this invention, no means have been provided for increasing and decreasing the cross section of a tube portion to be gripped in a mold, at several points. For example, when a bottle is being blow molded from a tube, the shoulder and bottom of the bottle are stretched from the plastic tube at localized points with the result that there is an extreme thinning of the bottle at the points where the body of the bottle joins the shoulder and bottom. It is, therefore, highly desirable that the cross section of the extruded tube be increased in alignment with these areas.

In the past attempts have been made to vary the cross section of extruded tubes to conform to the requirements of the molds. However, no suitable means have been provided for effecting the necessary timing of the variation in the extrusion orifice to produce a multi-cross section tube which is aligned with the molds of the blow molding apparatus.

It is, therefore, the primary object of this invention to provide a novel variable extrusion apparatus for use with a molding machine of the type which includes a plurality of molds which one after the other engage and pinch off a portion of an extruded tube, wherein the variable extrusion apparatus is driven in timed relation to the operation of the molding machine and is capable of producing varied cross sectional tubing in accordance with the requirements of the molds of the molding machine.

Another object of this invention is to provide a novel variable extrusion apparatus which has a timing mechanism including a plurality of individual control elements which are adjustably mounted wherein the cross section of an extruded tube may be repeatedly varied as desired for the particular requirements of the associated molding operation.

Still another object of this invention is to provide a variable extrusion apparatus wherein the cross section of the extrusion orifice of the extrusion nozzle is varied by means of an air cylinder and wherein the control valve for the air cylinder may be operated in a manner to provide for a tapering of the cross section of the tube as the cross section is varied.

Molding machines which are presently being constructed are specifically designed to accommodate different molds of different sizes. As a result, one molding machine may be selectively provided with different molds for different operations and the number of molds presented in one complete cycle of operation of the machine will vary in accordance with the size of the mold. Thus, known timing means for varying the cross section of an extruded tube will not operate on such a machine without the changing of a large number of parts.

In view of the foregoing, it is a further object of this invention to provide a novel variable extrusion apparatus which is driven by a molding machine for varying the cross section of an extruded plastic tube in timed relation to the movement of molds by the machine and in accordance with the requirements of the molds, and there being drive means between the molding machine and the variable extrusion apparatus which may be readily varied so as to vary the timing of the variation in the cross section of the extruded tube in accordance with a change in the number of molds incorporated in the molding machine.

A still further object of this invention is to provide a novel extrusion nozzle for extruding a continuous plastic tube wherein the cross section of the extrusion orifice of the nozzle is variable and wherein the orifice defining section of the nozzle is the smallest annular cross sectional area through which the extruded plastic must pass. By having the orifice defining section of the smallest annular cross sectional area through which the extruded plastic must pass, there is eliminated from the extrusion nozzle the following objectionable problems of existing extrusion nozzles which are of variable cross section. (1) A high pressure at the usual spider causes high shear rates and subsequent high temperature. (2) A break up of the polymer flow through the spider resulting in streaks and uneven wall thicknesses in the blown article as well as the hang up of polymer and pigment. (3) A sudden pressure drop in the interior or the nozzle, then pressure build up at a restriction followed by another pressure drop prior to the emergence of the plastic from the nozzle.

With the above, and other objects in view that will hereinafter appear, the nature of the invention will be more clearly understood by reference to the following detailed description, the appended claims and the several views illustrated in the accompanying drawings:

In the drawings:

FIGURE 3 is an enlarged side elevational view of the variable extrusion nozzle of FIGURE 2 taken generally along the line 3—3 and with parts of the extrusion nozzle being broken away and shown in section in order to illustrate the internal details thereof.

FIGURE 4 is a fragmentary vertical sectional view on an enlarged scale taken through the forward end of the extrusion nozzle and shows the same in a position for extruding a thickened cross sectional portion of a tube.

FIGURE 5 is an enlarged vertical sectional view taken along the line 5—5 of FIGURE 3 and shows further the details of the construction of the extrusion nozzle.

FIGURE 6 is an enlarged fragmentary vertical sectional view taken along the line 6—6 of FIGURE 2 and shows the manner in which the timing unit is associated with the control switch.

FIGURE 7 is an elevational view of a modified form of timing unit incorporating a plurality of switches operated by a single cam lobe.

FIGURE 8 is an elevational view taken from the left side of FIGURE 7 and shows further the details of the timing unit, a portion thereof being broken away and shown in section.

FIGURE 9 is a fragmentary elevational view showing a modified form of timing unit incorporating two fixed switches and two sets of cam lobes carried by the control cam.

Figure 1:
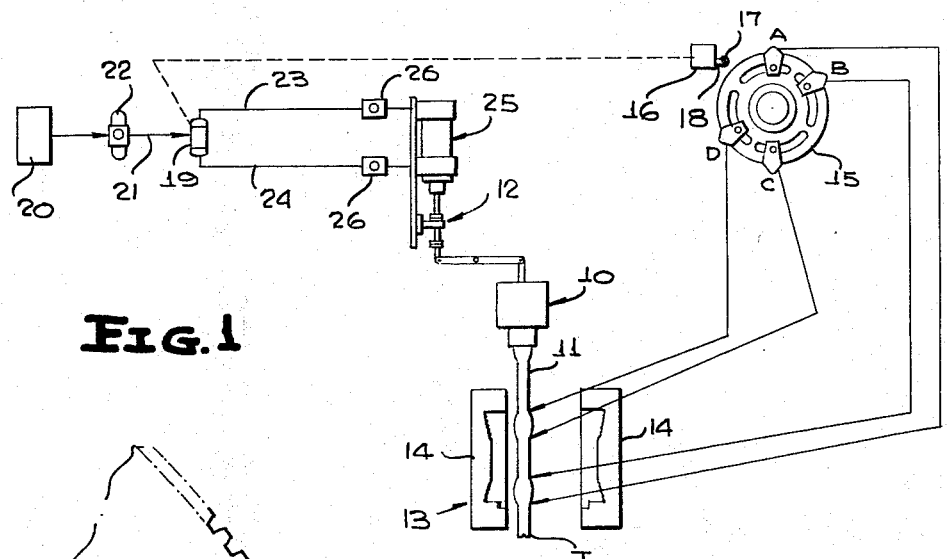
FIGURE 1 is a schematic view showing generally the operating details of the control for varying the cross section of the extrusion nozzle.

Before specific reference is made to the detailed showing in the drawings, it is desired to first make reference to Ruekberg, et al., Patent No. 2,784,452, issued on March 12, 1957, which broadly shows the type of molding machine to which this invention is applicable. It is to be understood, however, that the design of molding machines is greatly advanced since development of the Ruekberg et al. machine although the broad principle of having rotating molds mounted for rotation about a horizontal axis remains the same. In the customary molding machine, means are provided for automatically opening and closing the molds and a plastic tube is continuously extruded with portions of the plastic tube being gripped by the molds and pinched off from the remainder of the tube.

Reference is now made to FIGURE 1 of the drawings wherein the invention is schematically illustrated. In accordance with the invention, there is provided an extrusion nozzle, generally referred to by the numeral 10, for continuously extruding a plastic tube 11. The extrusion nozzle 10 is provided with a control mechanism, generally referred to by the numeral 12, for varying the cross section of the orifice thereof so as to vary the cross section of the extruded tube 11. In accordance with this invention, the control mechanism 12 is actuated in timed relation to the presentation of a mold, such as the mold 13, to the plastic tube 11 so that the cross section of the tube 11 is increased at specific points aligned with those portions of the mold wherein the greatest expansion of the tube occurs during a blow molding operation within the mold 13. The mold 13 is illustrated as including halves 14.

In order that the control mechanism 12 may be operated in timed sequence with the gripping of the extruded plastic tube 11 by molds 13, there is provided a cam 15 which is driven in a manner to be described hereinafter in timed relation to the movement of the molds 13 in the normal operation of the molding machine. The cam 15 carries a plurality of cam lobes A, B, C and D which correspond to points on the extruded tube 11 whereat the cross section of the tube is varied. The cam lobes are adjustably mounted on the cam 15 in a manner to be described in detail hereinafter so that the points of increase and decrease in cross section of the plastic tube 11 may be selectively varied in accordance with the particular requirements of a particular mold of the molding machine.

The cam lobes A, B, C and D operate a switch 16 in sequence by engaging a roller 17 of an actuator 18 of the switch 16. The switch 16 is electrically connected to an electrically actuated four-way valve 19. The four-way valve receives compressed air from a compressed air source 20 through a pipe 21 in which there is mounted a pressure regulator 22. A pair of pipes 23 and 24 extend from the four-way valve 19 to an actuating cylinder unit 25 of the control mechanism 12 with the pipes 23 and 24 being alternatingly supply and return lines depending upon the position of the four-way valve 19. Each of the pipes 23 has incorporated therein a conventional speed flow regulator 26 whereby the speed of operation of the cylinder unit 25 may be selectively controlled. It is to be understood that the engagement and actuation of the switch 16 by any one of the cam lobes A, B, C and D serves to electrically energize the four-way valve 19, which is of a conventional construction, to reverse the position thereof so that in one position, the pipe 23 is a supply line and the pipe 24 is a return line, and in the next position of the four-way valve 19 resulting from the actuation of the switch 16, the pipe 24 is a supply line and the pipe 23 is a return line.

Reference is now made to FIGURES 3, 4 and 5 in particular wherein the specific details of the extrusion nozzle 10 and the control mechanism 12 are shown. The extrusion nozzle 10 includes an adaptor 27 which is attached in a conventional manner to an extruder (not shown). A band heater 28 is disposed around the adaptor 27. A cross head 29 is carried by the adaptor 27 and has a chamber 30 formed therein and extending out through opposite sides thereof at right angles to each other.

A retainer 31 is secured to the underside of the cross head 29 in alignment with the outlet end of the chamber 30, as is shown in FIGURE 3. The retainer 31 is secured to the cross head 29 by means of bolts 32, as is best shown in FIGURE 5.

A nozzle shell 33 is releasably supported by the retainer 31 and is clamped therein by means of clamp bolts 34. The nozzle shell 33 abuts against the underside of the cross head 29 and has a flow passage 35 therethrough which is aligned with and forms a continuation of the chamber 30. It is to be understood that the shell 33 is replaceable in accordance with the particular requirements of the extrusion nozzle 10.

In order that the extrusion nozzle 10 may extrude a tube and the thickness of the wall of the tube may be controlled, a die core 36 extends down through the flow passage 35 and terminates in a head or tip 37 which is disposed within the lower end of the shell 33. The tip 37 has a lower part 38 which is of a maximum cross section and which is generally cylindrical in outline. The tip 37 also includes an upper tapered portion 39 about which the plastic is forced in the extrusion of a plastic tube. The tip 37 cooperates with the shell 33 to define an orifice 40 through which plastic material is extruded in the forming of a tube and the cross section of the orifice 40 is variable and determined by the position of the tip 37 relative to the shell 33.

A retainer 41 is mounted in the upper part of the cross head 29 and is secured in place by means of at least one bolt 42. The retainer 41 has a lower tubular extension 43 which extends down into the chamber 30 in axial alignment with the die core 36.

A die core positioning pin 44 extends through the retainer 41 and has the die core 36 removably secured thereto as at 45. The pin 44 is reciprocable through the retainer 41 to position the die core 36 and the tip 37 relative to the shell 33.

A generally L-shaped bracket, generally referred to by numeral 46, is mounted on the upper surface of the cross head 29. The bracket 46 includes a horizontal plate 47 which is releasably secured to the cross head 29 by means of bolts 48. The bracket 46 also includes an upstanding plate 50 which is suitably secured to the plate 47, as by welding, and is braced relative to the plate 47 by gusset plates 51.

The cylinder unit 25 of the control mechanism 12 includes a cylinder 52 having head portions 53 which are seated against the upper part of the vertical plate 50 and which are secured thereto by means of bolts 54. The cylinder unit 25 includes a piston rod 55 to which there is connected a lever arm 56. The lever arm 56 is carried by a pivot pin 57 which extends through the central portion thereof. The pivot pin 57 is, in turn, carried by brackets 58 which are secured to the horizontal plate 47 by means of bolts 59. The left end of the lever arm 56 is provided with a bifurcated fitting 60 which receives a pin 61 carried by the lower end of the piston rod 55. The pin 61 is part of a fitting 62 and is movable relative to the fitting 60 as the piston rod 55 is vertically reciprocated and the lever arm 56 rocks about the pivot pin 57. The right-hand end of the lever arm 56, as viewed in FIGURE 3, is provided with a second bifurcated fitting 63 in which there is positioned a pin 64 for relative sliding movement. The pin 64 is part of a fitting 65 which is secured to the upper end of the pin 44. The fitting 65 includes an adjusting nut 66 for vertically adjusting the position of the pin 64 relative to the pin 44. The fitting 65 has an internally threaded bore 67 in the upper part thereof for receiving a pipe fitting (not shown) which is a part of an air pressure system for supplying air through the die core 36. It is to be understood that the fitting 65, the pin 44, the die core 36 and the tip 37 are all hollow so that air under pressure may be delivered into a tube being extruded so as to prevent the internal collapsing of such a tube.

Referring now to FIGURE 4 in particular, it will be seen that the right end of the lever arm 56 has been pivoted downwardly as a result of the upward movement of the piston rod 55. In this downward position of the lever arm 56, the tip 37 is lowered relative to the shell 33 and the plastic tube which is being extruded has a portion of a maximum cross section, the tube being referred to by the letter T. When the piston rod 55 is moved downwardly and the right end of the lever arm 56 is pivoted upwardly to its position of FIGURE 3, the tip 37 is moved upwardly so as to decrease the cross section of the orifice 40 and thus reduce the cross section of the tube T, as is shown in FIGURE 3. It is to be understood that since the extruded plastic must all pass around the lower portion 38 of the tip 37, the extruded tube is of a constant internal diameter nothwithstanding the variation in wall thickness caused by the movement of the tip 37 relative to the shell 33.

The maximum and minimum wall thicknesses of the tube T may be controlled and restricted by limiting the amount of movement of the piston rod 55. To this end, the piston rod 55 is threaded as at 68 and a pair of stop nuts 69 and 70 are adjustably threaded thereon. A lock nut 71 is associated with the stop nut 69, while a lock nut 72 is associated with the stop nut 70. That portion of the piston rod 55 disposed between the stop nuts 69 and 70 passes through a stop plate 73 carried by a bracket 74 which, in turn, is mounted on the vertical plate 50 by means of bolts 75. The stop nuts 69 and 70 engage opposite faces of the stop plate 73 to limit the movement of the piston rod 55 and thus limit the movement of the tip 37.

It is to be understood that the cylinder unit 25 is of the double acting type and is positively retained in one of its two positions by the four-way valve 19. Thus, the position of the tip 37 is controlled solely by the cylinder unit 25 and not by the action of the extruded plastic flowing thereover.

At this time it is pointed out that the chamber 30 gradually decreases in cross section towards the orifice 40 and at no point in the chamber 30 or in the flow passage 35 is the flowing plastic restricted in its movement more upstream than it is at another position downstream thereof. Accordingly, there is a streamline flow of the plastic material through the extrusion nozzle 10 without streaking, hang up, localized high pressures, or pressure drops, and the orifice 40 defines the smallest annular cross section through which the plastic material passes. Therefore, high quality plastic tubes are extruded from the extrusion nozzle 10 in all positions of the tip 37.

Figure 2:
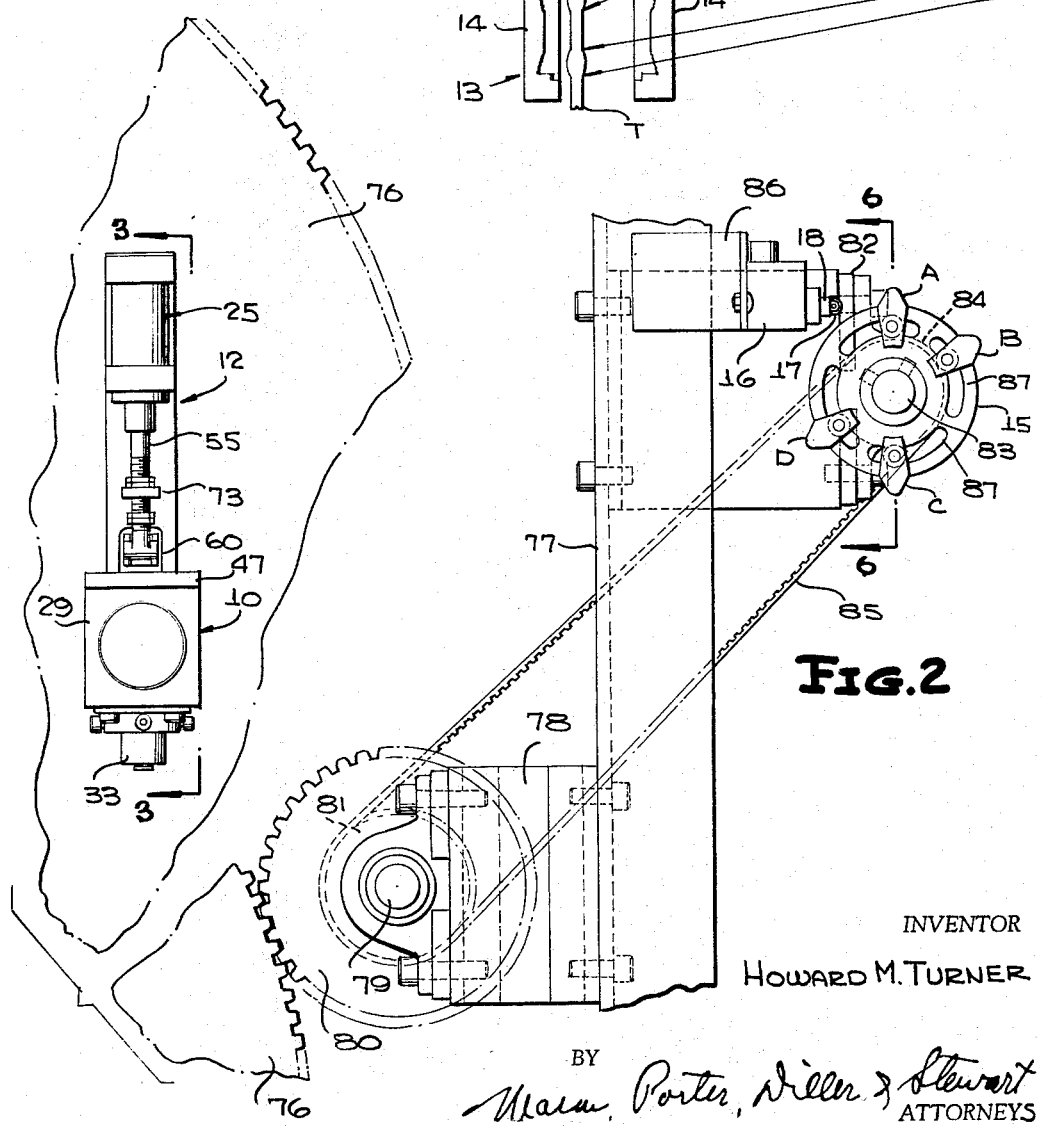
FIGURE 2 is a fragmentary enlarged elevational view of a molding machine having incorporated therein the variable extrusion apparatus, the molds being omitted from the molding machine.

Reference is now made to FIGURE 2 wherein a large gear 76, which is part of a molding machine, is illustrated. It is to be understood that the rate of rotation of the gear 76 is the same as that of the rate of rotation of molds of the molding machine. A suitable upstanding support 77 is disposed in an out-of-the-way position adjacent the gear 76 and a suitable bearing assembly 78 is mounted on the support 77. The bearing assembly 78 supports a shaft 79 which carries a small gear 80 as compared to the diameter of the gear 76. The gear 80 is meshed with the gear 76 and is driven therefrom. The shaft 79 is also provided with a sprocket 81 which is driven by the gear 80 through the shaft 79.

A second bearing assembly 82 is carried by the vertical support 77 remote from the bearing assembly 78. The bearing assembly 82 carries a shaft 83 to which there is secured for rotation therewith a sprocket 84 which is in the same plane as the sprocket 81. An endless drive chain 85 is entrained over the sprockets 81 and 84 so as to drive the shaft 83 in timed relation to the movement of the shaft 79. The cam 15 is secured to the shaft 83 for rotation therewith.

The switch 16 is carried by a suitable mounting bracket 86 which, in turn, is suitably secured to the vertical support 77.

Reference is now made to FIGURES 2 and 6 in particular, wherein it will be seen that the cam 15 is provided with a plurality of arcuate slots 87 which are concentric with the axis of the shaft 83. Each of the cam lobes A, B, C and D is of a generally L-shaped cross section and includes a first leg 88 and a second leg 89. The first leg is disposed in face-to-face engagement with the cam 15 and receives a bolt 88' which passes through an associated one of the associated slots 87 to clamp the associated cam lobe in an adjustable position on the cam 15. The second leg 89 engages the peripheral surface of the cam 15 and defines the lobe portion of the cam lobe.

It is to be understood that the cam 15 is driven at a rate wherein the cam 15 is rotated one full revolution for the arcuate movement of the gear 76 corresponding to the spacing of adjacent molds 13. The proper timing of the cam 15 to the operation of the molding machine is accomplished by varying the sprockets 81 and 84 in accordance with the spacing of the molds.

Reference is now made to FIGURE 1 wherein it will be seen that the positions of the cam lobes A, B, C and D correspond to positions where the cross section of the extruded tube T changes in accordance with the requirement of the mold 13 in which a clamped portion of the tube T is to be blow molded. By adjusting the angular positions of the cam lobes, the points of increase and decrease of cross section of the extruded tube may be varied. Further, by adjusting the speed of air flow between the four-way valve 19 and the cylinder unit 25, the change in cross section of the tube may be varied between a very gradual tapered change to a very abrupt change.

Although it is possible to control the four-way valve 19 with a single switch 16 which must be of the circuit reversing type, it is also possible to utilize two separate switches in the manner shown in FIGURE 9. The switches 90 and 91 are disposed in side-by-side relation and are engaged by cam lobes A, B, C and D with the cam lobes A and C being reversed as to their positions shown in FIGURE 2, for example, so as to be on opposite sides of the cam 15 from the cam lobes B and D. When the cam lobes are disposed on opposite sides of the cam 15, the cam lobes are square cut as compared to the angular corners of the cam lobes shown in FIGURE 6. Except for the fact that the control unit shown in FIGURE 9 utilizes two switches and has the cam lobes disposed on opposite sides of the cam, the control unit of FIGURE 9 is the same as that illustrated in FIGURES 2 through 6 and the ultimate operation of the control mechanism 12 remains the same.

An alternative control unit is illustrated in FIGURES 7 and 8. The control unit of FIGURES 7 and 8 includes a shaft 92 which is provided at one end with an adaptor 93 for attachment to a drive shaft, such as the shaft 83. The shaft 92 carries a fitting 94 to which there is secured a plate 95. A second plate 96 is adjustably secured to the plate 95 by means of bolts 97. A plurality of switch plates 98 are adjustably clamped to the plate 96 by means of fasteners 99 which pass through arcuate slots 100 in the plate 96 and are secured to back-up plates 101 disposed intermediate the plates 95 and 96. The fasteners 97 securing the plate 96 to the plate 95 pass through arcuate slots 102 formed in the plate 95. In this manner, by adjusting the plate 96 relative to the plate 95, the switch plates 98 may be individually adjustably positioned relative to the plate 96, and the entire assembly of the switch plates 98 and the plate 96 may be adjusted relative to the plate 95.

Each of the switch plates 98 carries a switch 103 which is provided with an actuator 104 having a roller 105. The rollers 105 are in position to be engaged by a single cam lobe 106 which is releasably secured to the shaft 92 by means of a hub 107. As the cam lobe 106 rotates relative to the switches 103, it will, in sequence, strike the rollers 105 of the switches and cause sequential operation of the switches 103. The switches 103 are connected to the fourway valve 19 so as to first shift the four-way valve to one position and then return it to its original position.

It will be readily apparent that the advantages of the invention are two-fold. The specific construction of the extrusion nozzle permits the desired uninterrupted flow of plastic material therethrough without the usual disadvantages of other types of extrusion nozzles having variable orifices. At the same time, the provision of the extrusion nozzle with a control mechanism that is operated in timed sequence to an associated molding machine permits the timed and proper variation in cross-section of the extruded tube in accordance with the requirements of the molds receiving the extruded tubes. These functions of this invention solve problems existing in the art and permit the proper formation of good appearing, high strength plastic articles with a minimum of waste of plastic material due to the provision of excess plastic material.

Although only several preferred embodiments of the invention have been illustrated and described herein, it will be readily apparent that minor variations may be made in the invention within the spirit and scope thereof, as defined in the appended claims.

I claim:
1. In combination with a continuously operating molding machine having a plurality of molds adapted to sequentially grip and remove portions of an extruded tube, a variable extrusion apparatus for continuously extruding a tube having a controlled varied cross-section, said extrusion apparatus comprising an extrusion head including a die shell and a die core combining to define an extrusion orifice, said die core being shiftable relative to said shell and having a varied cross-section whereby the cross-section of said orifice may be varied to vary the cross-section of an extruded tube, means for holding said die core in an adjusted position, means for shifting said holding means in timed relation to the operation and demands of the molding machine to selectively vary the cross-section of the extruded tube, and means for adjusting the operation of said shifting means for adjustably controlling both the minimum wall thickness and the maximum wall thickness of the extruded tube.

2. In combination with a continuously operating molding machine having a plurality of molds adapted to sequentially grip and remove portions of an extruded tube, a variable extrusion apparatus for continuously extruding a tube having a controlled varied cross-section, said extrusion apparatus comprising an extrusion head including a die shell and a die core combining to define an extrusion orifice, said die core being shiftable relative to said shell and having a varied cross-section whereby the cross-section of said orifice may be varied to vary the cross-section of an extruded tube, means for holding said die core in adjusted position, means for shifting said holding means in timed relation to the operation and demands of the molding machine to selectively vary the cross-section of the extruded tube, and means for varying the rate of cross-sectional change of the tube being extruded with respect to both an increase and a decrease in the cross-section thereof.

3. The combination as defined in claim 1 wherein said adjusting means are adjustable stop members for limiting the movement of said shifting means between at least two preselected positions of adjustment of said stop members.

4. The combination as defined in claim 2 wherein said means for varying the rate of cross-sectional change of the tube includes regulatable valve means for controlling the rate of movement of said shifting means.

5. In combination with a continuously operating molding machine having a plurality of molds adapted to sequentially grip and remove portions of an extruded tube, a variable extrusion apparatus for continuously extruding a tube having a controlled varied cross-section, said extrusion apparatus comprising an extrusion head including a die shell and a die core combining to define an extrusion orifice, said die core being shiftable relative to said shell and having a varied cross-section whereby the cross-section of said orifice may be varied to vary the cross-section of an extruded tube, means for holding said die core in adjusted position, means for shifting said holding means in timed relation to the operation and demands of the molding machine to selectively vary the cross-section of the extruded tube, means for adjusting the operation of said shifting means for adjustably controlling both the minimum wall thickness and the maximum wall thickness of the extruded tube, and means for varying the rate of cross-sectional change of the tube being extruded with respect to both an increase and a decrease in the cross-section thereof.

6. The combination as defined in claim 5 wherein said adjusting means are adjustable stop members for limiting the movement of said shifting means between at least two preselected positions of adjustment of said stop members, and said means for varying the rate of cross-sectional change of the tube includes regulatable valve means for controlling the rate of movement of said shifting means.

References Cited by the Examiner

UNITED STATES PATENTS

| | | | |
|---|---|---|---|
| 1,834,986 | 12/1931 | Strawn | 92—13 X |
| 2,044,961 | 6/1936 | Waner | 18—14 |
| 2,458,752 | 1/1949 | Waidelich | 74—568 |
| 2,492,200 | 12/1949 | Stieglitz | 92—13 X |
| 2,580,787 | 1/1952 | Johnson. | |
| 2,632,202 | 3/1953 | Haines | 18—5 |
| 2,750,625 | 6/1956 | Colombo | 18—5 |
| 2,780,835 | 2/1957 | Sherman | 18—14 |
| 3,005,231 | 10/1961 | Pechthold | 18—5 |
| 3,019,481 | 2/1962 | Negoro | 18—5 |
| 3,023,461 | 3/1962 | Sherman | 18—55 |
| 3,110,928 | 11/1963 | Engman | 18—5 |
| 3,114,932 | 12/1963 | Donnelly | 18—5 |
| 3,130,600 | 4/1964 | Toensing | 74—568 |
| 3,147,515 | 9/1964 | Amsden | 18—14 |
| 3,186,032 | 1/1965 | Harwood | 18—14 X |
| 3,205,534 | 9/1965 | Langdecker | 18—14 X |

OTHER REFERENCES

Fisher, E. G.: Extrusion of Plastics, N.Y., Interscience Publishers Inc., 1958.

WILLIAM J. STEPHENSON, *Primary Examiner.*

MARCUS U. LYONS, MICHAEL V. BRINDISI,
*Examiners.*

L. D. RUTLEDGE, L. S. SQUIRES, *Assistant Examiners.*